United States Patent [19]

Breaker

[11] Patent Number: 5,316,320
[45] Date of Patent: May 31, 1994

[54] ISOLATION GASKET FOR CRITICAL SERVICE FLOW LINE APPLICATIONS

[75] Inventor: John V. Breaker, Golden, Colo.

[73] Assignee: Corrosion Control Corp., Lakewood, Colo.

[21] Appl. No.: 853,489

[22] Filed: Mar. 18, 1992

[51] Int. Cl.$^5$ .............................................. F16J 15/12
[52] U.S. Cl. ............................. 277/233; 277/207 A; 277/227; 285/368
[58] Field of Search ............... 277/233, 235 R, 235 A, 277/235 B, 101, 207 A, 227; 285/363, 368, 910, 336

[56] References Cited

U.S. PATENT DOCUMENTS

| | | |
|---|---|---|
| 524,162 | 8/1894 | Cochrane ............................ 277/233 |
| 969,423 | 9/1910 | Tanner et al. . |
| 1,071,585 | 8/1913 | Rossell ............................... 285/910 |
| 1,491,032 | 4/1924 | Croker . |
| 1,527,535 | 2/1925 | Bockwitz . |
| 1,592,175 | 7/1926 | Boyd . |
| 1,983,228 | 12/1934 | Hall . |
| 1,987,235 | 1/1935 | Janeway, Jr. . |
| 2,422,009 | 6/1947 | Goetze . |
| 2,462,493 | 2/1949 | Hamer ................................. 285/368 |
| 2,513,178 | 6/1950 | Jackson ............................... 285/363 |
| 2,552,750 | 5/1951 | Thornhill . |
| 2,752,579 | 6/1956 | Caldwell et al. . |
| 2,860,311 | 11/1958 | Balian . |
| 2,938,569 | 5/1960 | Goodrich . |
| 2,940,787 | 6/1960 | Goodner . |
| 3,158,380 | 11/1964 | Carrell et al. ...................... 277/235 |
| 3,284,108 | 11/1966 | West . |
| 3,508,766 | 4/1970 | Kessler et al. . |
| 3,575,431 | 4/1971 | Bryant . |
| 3,618,989 | 11/1971 | Ito ....................................... 285/336 |
| 3,836,183 | 9/1974 | Battle . |
| 4,017,102 | 4/1977 | Henderson . |
| 4,108,476 | 8/1978 | Krupp . |
| 4,109,923 | 8/1978 | Tuckmantel ........................ 277/101 |
| 4,268,070 | 5/1981 | Adams . |
| 4,406,467 | 9/1983 | Burger . |
| 4,635,949 | 1/1987 | Lucas et al. ....................... 277/235 B |
| 4,690,438 | 9/1987 | Kanczarek ......................... 277/235 R |
| 4,776,600 | 10/1988 | Kohn ................................... 277/101 |
| 4,848,806 | 7/1989 | Miller ................................ 277/235 R |

FOREIGN PATENT DOCUMENTS

| | | | |
|---|---|---|---|
| 3036700 | 5/1982 | Fed. Rep. of Germany | ........ 277/27 |
| 0674447 | 1/1930 | France | .................................. 285/336 |
| 0180166 | 10/1984 | Japan | .................................... 277/205 |

Primary Examiner—William A. Cuchlinski, Jr.
Assistant Examiner—Daniel G. DePumpo
Attorney, Agent, or Firm—Timothy J. Martin; Carl Schaukowitch

[57] ABSTRACT

An isolation gasket is provided for interposition between joined pieces of a flow line. The gasket has a gasket body which electrically isolates the pieces from one another. In one embodiment the gasket has a pair of composite, insulative linings laminated on opposite sides of a metal core. An endless channel on each side of the gasket body surrounds a central flow opening and is formed of a depth sufficient to extend through the insulative lining and into the metal core. The outer sidewall of each endless channel is at an acute angle to its bottom wall, and the inner sidewall is at an angle of at least ninety degrees with respect to the bottom wall. The channels may be opposed to or offset from one another. Different channel cross-sections are described. An alternative gasket body may eliminate the metal core and be either a laminated composite body or of integral construction. Here, the endless channels are offset, and depths of the endless channels together exceed the gasket thickness so that the channels overlap to prevent radial fluid migration. In each case, seal elements are disposed in each channel and are configured so that the acutely angled channel outer sidewalls reduce the danger of gasket rollout.

23 Claims, 4 Drawing Sheets

ISOLATION GASKET FOR CRITICAL SERVICE FLOW LINE APPLICATIONS

FIELD OF THE INVENTION

The present invention broadly concerns gaskets which are adapted to be interposed between joined pieces in a flow line that is operative to convey a flow of fluid. More specifically, however, the field of the present invention is directed to isolation gaskets which serve both as a seal between connected pieces in a flow line, such as between two pipe sections, as an insulator operative to electrically isolate the joined pieces from one another. The present invention even more specifically concerns isolation gaskets used in critical service applications wherein operating pressures and/or temperatures are elevated.

BACKGROUND OF THE INVENTION

The use of gasket materials as seals interposed in the joints or connections of various pieces of a flow line system has long been known, and the variety of sizes, shapes and materials used for gasket seals is multitudinous. Indeed, the needs of different flow lines and the demands placed upon seals in different flow line applications require increasing innovation in gasket technology, especially in flow lines of a type designated as critical service, i.e., flow lines serving to convey fluids at elevated pressures and/or temperatures.

The oil and gas production industry provides a ready example of an industry that requires critical service gasket technology due to the pressures and temperatures involved as well as to corrosive forces inherent in the extraction of oil and/or gas and the transportation of the produced oil/gas to refineries, gas plants, etc. The continued need for improved technology for these pipeline systems is three-fold. First, the pipeline systems employed in the oil and gas industry represent a huge capital investment so that the protection against damage of the various components of the system is cost effective. Second, there are high labor costs associated with the repair and maintenance of such pipeline systems where damage due to corrosion or gasket blowout occurs; these costs result from the amount of time involved to repair the system as well as in the expenses often associated where such pipeline systems are in remote geographic locations, as increasingly becoming the case in the oil and gas production industry. Third, and perhaps more significant, is the potential for environmental damage which can occur, especially in remote, pristine environments, should a pipeline system leak due to deteriorated pipeline components or connections therebetween. Such leakage in the presence of an electric field also creates the environmental danger of fire.

Damage to and deterioration of components in a oil and/or gas pipeline system is a problem that has long time been recognized and stems from several forces, including oxidation, chemical breakdown, electrolysis breakdown and mechanical breakdown. Although providing gasket materials which are resistive to normal oxidation and which are strong enough to withstand the mechanical forces in critical service applications must not be under emphasized, nonetheless the principal focus of deterioration of components used in oil and gas production concern destruction or breakdown of metals either by chemical or electrochemical reaction with the production environment. Numerous substances in the production environment serve to stimulate the corrosion process of metal components, for example, carbon dioxide, hydrogen sulfide and saltwater which are all extremely corrosive to the pipe system and extraction components. These corrosive compounds are abundant in the soil and sea extraction environments typically encountered in the hydrocarbon industry. It has for sometime been further recognized that the flow of oil and/or gas through a metal pipeline causes the production of an electrical current, and the discharge of this current accelerates corrosion of the pipeline components and increase fire danger where leakage result. Also, where two dissimilar metals are in electrical communication, a galvanic cell may be produced which accelerates corrosion of the metal components.

As a result of the recognition of the dangers of electric currents in pipeline systems, there have been many types of dielectric gaskets developed for use in the oil industry. Often, such gaskets employ soft dielectric materials either alone or as a lining on a metallic annular disk. Soft dielectric materials are subject to over compression upon installation which itself may result in leakage at the connective joint. The use of harder dielectric materials encounters problems of cracking when over compressed during installation. In either event, in critical service applications, the high pressure of the contained fluid can cause leakage through the dielectric gasket material and, since the electrical insulating capabilities of the dielectric gasket is a direct function of its thickness, such gaskets are vulnerable to blowout due to the high pressures of the contained fluid when thick section dielectric gaskets are employed.

As a result of these problems, a significant improvement in dielectric gaskets is described in U.S. Pat. No. 4,776,600 issued Oct. 11, 1988 to Kohn, and the present invention is intended to be an improvement over the dielectric pipe flange gasket described in that patent. The present invention provides similar advantages of features with a simplified structure from a manufacturing standpoint. In the '600 patent to Kohn, then, a pipeline gasket is shown which is in annular gasket body which is a lamination of a pair of dielectric linings on opposite sides of a metallic disk. Opposite seal grooves are formed through each lining and into the metal disks, and these grooves are dovetail in cross-section. Ring seals, either in the form of O-rings or lip seals, are shown to be received in these dovetail channels. The structure shown in the Kohn patent has been sold for several years and, more than one year prior to the filing of this application, an improved seal constructed of a spring-biased polytetrafluoroethylene ring has replaced the O-rings and lip seals described in the '600 patent. This improved ring seal has an outer face which matches the outer sidewall of the dovetail and is thicker in dimension than the depth of the dovetail channel. Its width, however, is less than the width of the dovetail so that, upon compression, it may deform within the dovetail channel.

While the structure shown in the Kohn '600 patent as well as the improvement in the ring seal described above have offered a dramatic improvement in the isolation gasket industry, there are nonetheless remains the need to produce a gasket of comparable performance at reduced manufacturing costs. The present invention therefore is directed to such an improvement.

SUMMARY OF THE INVENTION

It is an object of the present invention to provide a new and useful isolation gasket which can electrically insulate joined pieces in a flow line.

It is a further object of the present invention to provide a gasket which can be used in critical service applications wherein operating pressures in excess of 30,000 psi are experienced while at the same time which acts to reduce the incidents of electrically induced corrosion.

It is another object of the present invention to provide a gasket which reduces or eliminates fluid trap corrosion or flow induced erosion experienced in standard steel O-ring gaskets at flange connections in typical pipeline systems.

Yet another object of the present invention is to provide a high strength gasket which can withstand high compressive forces of up to 80,000 psi to reduce the risk of failure when excessive compression forces are applied during installation.

Still a further object of the present invention is to provide a relatively thin gasket which does not require excessive dismantling of a pipeline system in order to retro-fit the gasket in various pipe connections yet, despite its thinness, nonetheless provides both an adequate seal and sufficient electrical isolation to reduce the risk of corrosion at the connection due to electrical currents.

Yet another object of the present invention is to provide a gasket which can be manufactured at reduced costs yet which prevents leakage and gasket blowout in critical service applications.

According to the present invention, then, a gasket is described which gasket is adapted to be interposed between flow pieces in a flow line, such as a pipeline system, that is operative to convey a flow of fluid, especially at high pressure. Broadly, the gasket comprises a relatively thin, flat gasket body which is formed of an inner plate of metal and a pair of outer linings of electrically insulative or dielectric material bonded to the inner plate. The gasket body has a central opening, and an endless channel is formed completely through each of the outer linings and into the surface of the inner metal plate. Each endless channel is spaced from but extends around the central opening and has a bottom wall, an outer sidewall and an inner sidewall. The outer sidewall is formed at an acute angle $\phi$ with respect to the bottom wall while the inner sidewall of the channel is formed at an angle $\theta$ of at least 90° with respect to the bottom wall. A seal element is then disposed in each of the channels.

The channels may be of the same size and opposite one another, or they may be differently sized so that they are offset from one another. Here, the channels may either take cross-section of a parallelogram or a trapezoid. Preferably, each seal element has a quadrilateral cross-section so that it has a bottom face to abut the bottom wall of a respective channel, a top face opposite the bottom face and an inner and an outer face respectively oriented towards the inner and outer walls of its respective channel. Preferably the thickness of each of these seals, as defined as the distance between the bottom face and the top face thereof, is greater than the depth of the endless channel so that the top face of the seal protrudes slightly from the surface of the gasket on either side thereof and is therefore subject to contact with and compression by the joined pieces of the flow line. This compressive force tends to compress and deform each seal within its respective channel. In the exemplary embodiments of the present invention each seal has an outer face formed at an acute angle $\alpha$ with respect to its bottom face with this acute angle $\alpha$ being greater than the acute angle $\phi$ of the outer sidewall with the bottom wall of the channel. Further, it is preferred that the inner face form a smaller angle $\beta$ with respect to the bottom face of the ring seal than the angle $\theta$ between the inner sidewall and the bottom wall of the respective channel that receives the ring seal. This structure allows for some space to exist to accommodate the deformation of the seal when compressive forces are applied.

It is preferred to form the gasket of the present invention as an annular flange gasket adapted to fit between flanges of two pipe sections in a pipeline system. Thus, the central opening is circular and has the same diameter as the flow cross-section of the pipe. Likewise, the endless channels are each circular and are concentric with the central axis of the central opening. The inner plate of metal is preferably formed of stainless steel while the outer linings are preferably glass reinforced epoxy. Alternately, a gasket body of integral composite construction may be used, but in which case the channels are offset and each has a depth that extends more than fifty percent through the gasket body. The ring seals in each embodiment are preferably a spring-loaded polytetrafluoroethylene.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention generally concerns gaskets which may be inserted between various joint connections in a flow line system, and the present invention is specifically directed to insulative gaskets for the oil and gas industry and pipeline distribution systems, especially of the type used in critical service applications of high pressure and/or temperature. It should be appreciated, though, that the technology described herein could be used for gasket applications other than in flow lines. While the exemplary embodiments of the present invention is further described with respect to an annular flange gasket of the type adapted to be interposed between flanges of adjacent pipe sections, it should be understood at the outset of this description that the improvements encompassed in this description may be applied to gaskets of other configurations, flow line applications and joint connections. Thus, the ordinarily skilled engineer should readily be able to implement the improvements described with respect to the present invention in situations requiring gaskets of similar performances.

Figure 1:
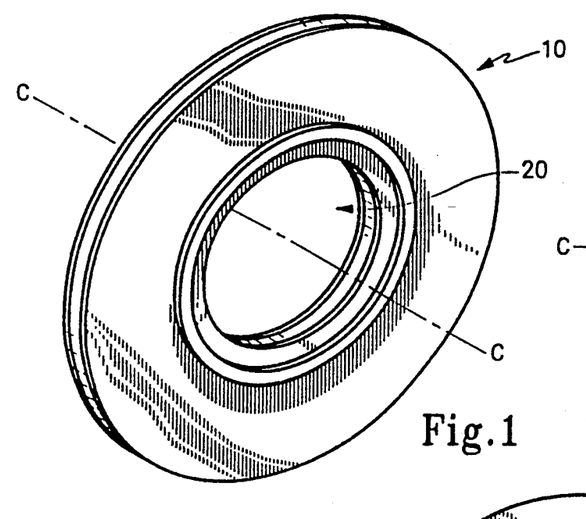
FIG. 1 is a perspective view of an isolation gasket according to a first exemplary embodiment of the present invention shown as a flange gasket.
Figure 2:
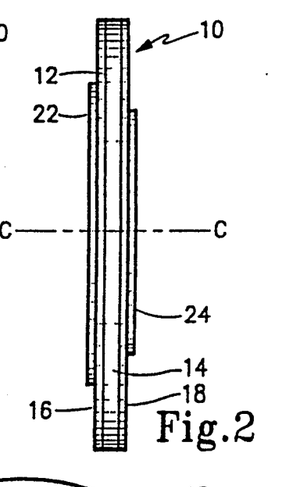
FIG. 2 is a side view in elevation of the flange gasket shown in FIG. 1.
Figures 3, 4:
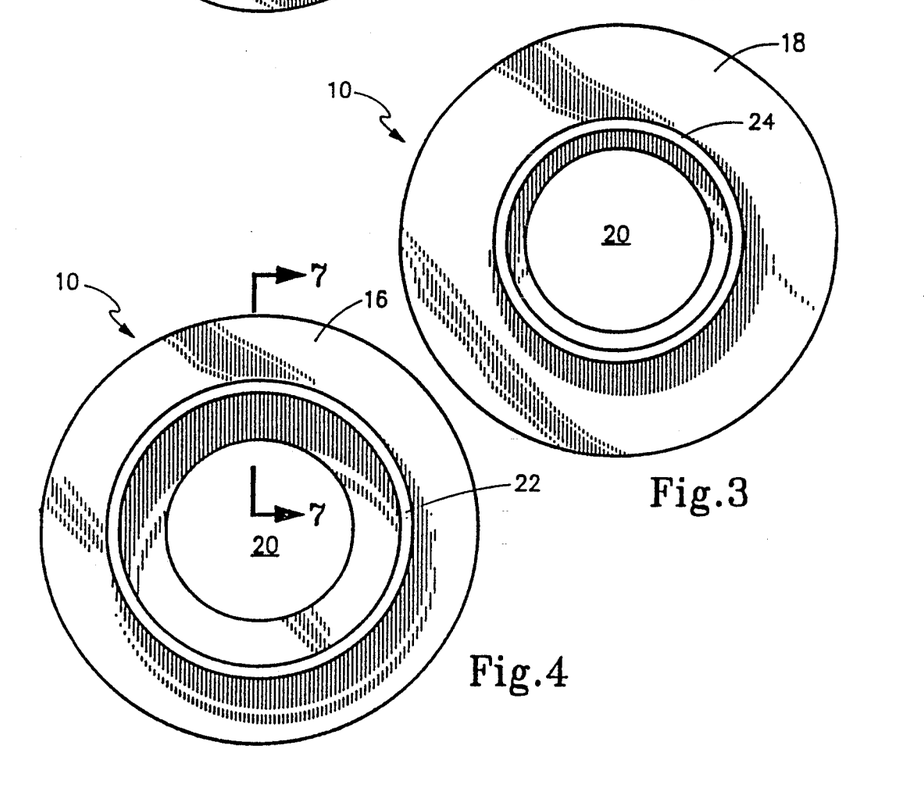
FIG. 3 is as front view in elevation of the flange gasket shown in FIGS. 1 and 2.
FIG. 4 is a back view in elevation of the flange gasket shown in FIGS. 1-3.
Figure 5:
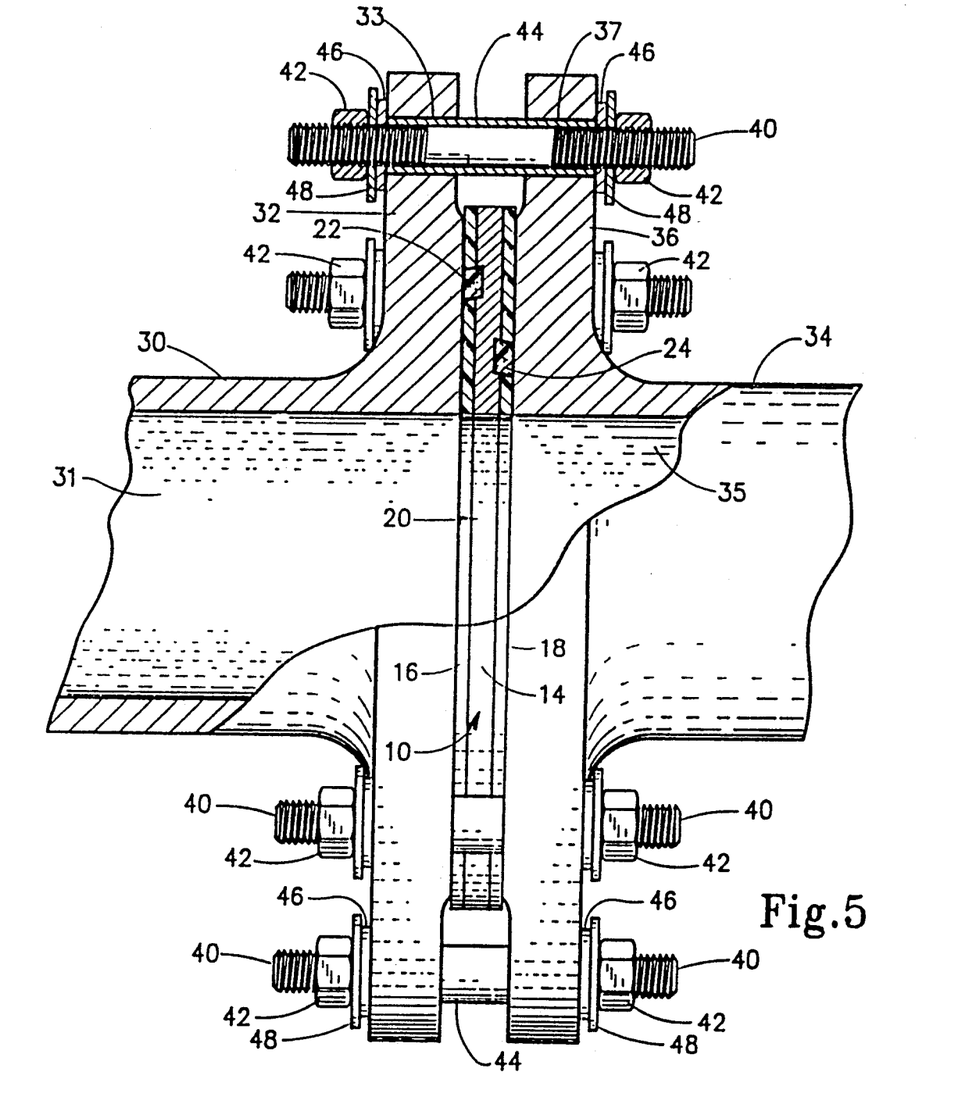
FIG. 5 is a side view in elevation, partially broken away, showing the flange gasket of FIGS. 1-4 interposed between a pair of pipe sections in a flow line according to the first exemplary embodiment of the present invention.

A first exemplary embodiment of the gasket according to the present invention is generally shown in FIGS. 1–4, and this gasket is shown in use in FIG. 5. Thus, as is shown in these Figures, gasket 10 is shown as a laminated gasket body 12 formed of an annular flat inner metal plate 14 onto which is bonded a pair of outer insulative linings such as first outer lining 16 and second outer lining 18 formed of a dielectric material. Gasket 10 therefore has the shape of an annulus with a circular central opening 20. A pair of seal elements, such as first ring seal element 22 and second ring seal element 24, are received in endless channels concentric with central opening 20 about a central axis "C". Ring seal elements 22 and 24 are received in these respective endless channels which are cut into gasket body 12, as more thoroughly described below.

Gasket 10 is adapted to be interposed between joined pieces in a flow line that is operative to convey a flow of fluid, especially high pressure fluid. Thus, for purposes of example, gasket 10 is shown in FIG. 5 as interposed in a flange joint connection between two adjacent sections of pipe in an oil and/or gas pipeline system. With reference to FIG. 5, then, it may be seen that a first section of pipe 30 has a circular flange 32 which is adapted to be placed in opposed, facing relation with circular flange 36 of a second pipe section 34. First pipe 30 has an interior passageway 31 which is thus axially aligned with interior passageway 35 of second pipe 34. Flange 32 is provided with a plurality of bolt openings 33 which axially align with bolt openings 37 of circular flange 36 in order to receive connecting tie-rods or bolts 40 which in turn receive nuts 42 to compressively join pipe sections 30 and 34 together. It may also be appreciated in reference to FIG. 5 that gasket 10 is adapted to be compressed between flanges 32 and 36 so as to seal the joint between pipe sections 30 and 34. To this end, it may be seen that central opening 20 of gasket 10 is sized to similarly to and aligns with passageways 31 and 35 to permit fluid flow therethrough. At the same time, ring seals 22 and 24 are respectively sized to contact and establish a seal with flanges 32 and 36, respectively.

As noted in the background of this application, it is important for gasket 10 to survive high compressive forces which may occur should nut and bolt sets 40, 42 be over-torqued during installation in the field. Furthermore, it is important that pipe sections 30 and 34 be electrically isolated from one another to prevent the build-up and condition of potentially dangerous and damaging electric currents. To accomplish both of these objects, linings 16 and 18 are formed of a dielectric material, preferably glass re-inforced epoxy material such as NEMA G-11 which is bonded to inner metal plate 14 which is formed of a high strength stainless steel such as 316SS. To further complete the electrical isolation, and as is known in the art, an insulative sleeve 44 and an insulative washers 46 (which are interposed between nuts 44 and standard washers 48) are provided for each bolt and nut set 40, 42. Insulative sleeves 44 and insulative washers 46 may be formed of any convenient insulating or dielectric material, but it is important that washers 46 be of a construction sufficient to allow them to withstand the compressive forces when nuts 42 are torqued onto bolts 40.

From the foregoing, it may be appreciated that plate 14 provides a core of high structural integrity and, to this end, may typically be approximately 2 mm thick. The thickness of each lining 16, 18 may be selected to yield the desired electrical isolation but, in a preferred construction, linings 16 and 18 may be approximately 1 mm to 1½ mm in thickness. This structure provides a gasket having the capability of withstanding compressive forces up to approximately 80,000 psi with the electrical standoff capacity of approximately 400 vpm. Furthermore, a gasket of this dimensioning is able to withstand flow line pressures of 10,000 psi and is easily able to operate in temperatures ranging from approximately −200° to +350° (Farenheit). Also, this dimensioning yields a relatively thin gasket that may retro-fit existing pipelines with a minimum amount of disassembly of the pipeline structure.

In manufacture, the exposed surfaces of plate 14 are roughened, and the opposed surfaces of first and second outer lining 16 and 18 are likewise roughened so that they may be laminated together by means of a suitable epoxy resin. This bonding is relatively permanent so that separation by shear is resisted because of the strength of the epoxy adhesive as well as the interface friction applied when the flanges 32 and 36 are torqued together. Thus, the laminate gasket body 12 acts as a single piece construction. Annular plates, such as plate 14, and annular linings, such as lining 16 and 18, may be separately made and then bonded together. Alternatively, a large sheet of metal may have sheet-like layers bonded thereto after which a plurality of gaskets 10 may be cut from the laminated sheet by a water jet cutter or other cutting tool as is known in the art.

Figure 6:
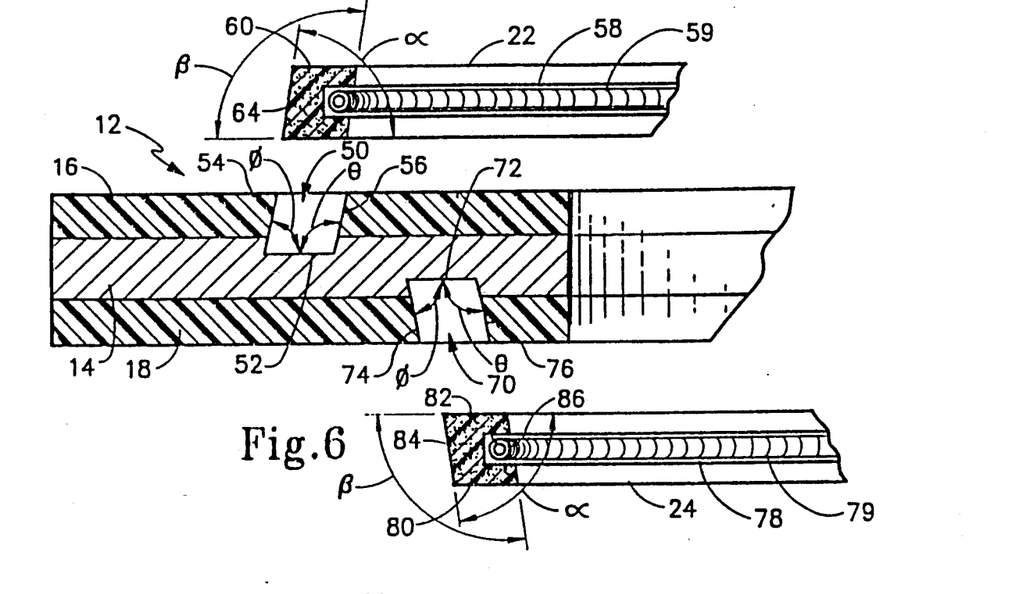
FIG. 6 is a side view in cross-section showing the flange gasket of FIGS. 1-4 with the ring seals removed therefrom.
Figure 7:
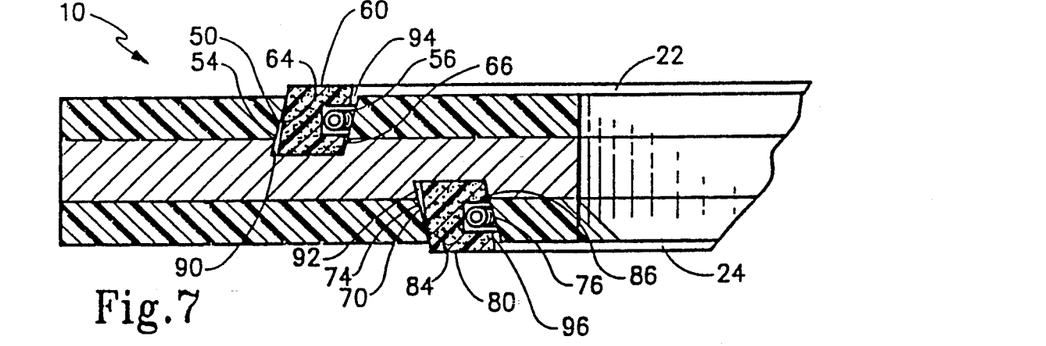
FIG. 7 is a cross-sectional view, similar to FIG. 6, but showing the ring seals inserted in the gasket body and also is a cross-sectional view taken about lines 7—7 of FIG. 4.
Figure 8:
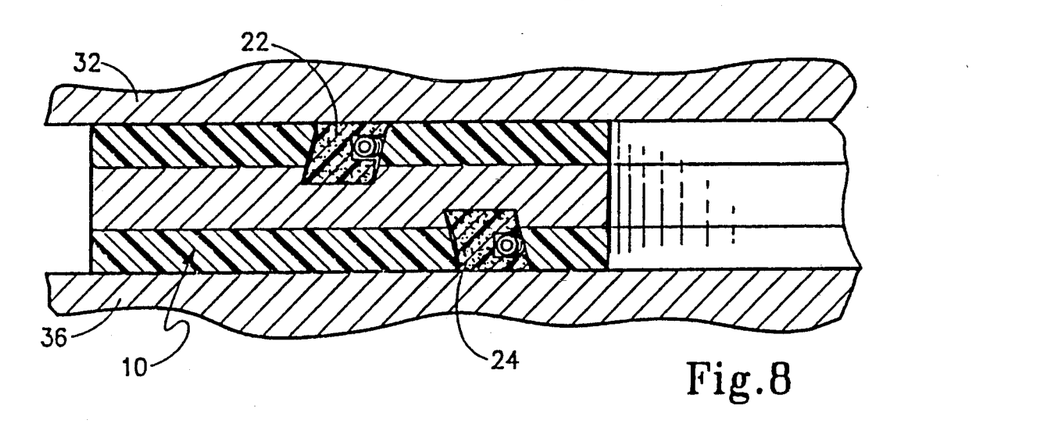
FIG. 8 is a cross-sectional view, similar to FIG. 7 but showing the ring seals in a compressed state between a pair of flanges.

An important feature of the present invention resides in the construction of the endless channels which receive seal elements 22 and 24 and, in addition, the dimensioning and configuration of the cross-section of the seals 22 and 24, themselves. These features are best shown in FIGS. 6–8 wherein it may be seen that first seal element 22 is adapted to be received in a first endless, circular channel 50 while ring seal 24 is adapted to be matably engaged with a second circular, endless channel 70. Channel 50 has a bottom wall 52, an outer sidewall 54 and an inner sidewall 56. Similarly, second channel 70 has a bottom wall 72, an outer sidewall 74 and an inner sidewall 76. Outer sidewall 54 and bottom wall 52 are formed at an angle $\phi$ with respect to one another and, likewise, outer wall 74 and bottom wall 72 of channel 70 are formed at $\phi$ with respect to one another. Inner sidewall 56 and bottom wall 52 of channel 50 are formed at an angle $\theta$ to one another, and similarly inner sidewall 76 and bottom wall 72 are formed at an angle $\theta$ with respect to one another. In this construction, angle $\phi$ is an acute angle while angle $\theta$ is at least 90° but is preferably an obtuse angle.

Each of channels 50 and 70 are cut a sufficient depth into gasket body 12 so that they penetrate completely through linings 16 and 18 and into the core of metal plate 14. Thus, any migration of fluid which might otherwise travel through the interface between linings 16, 18 and plate 14 as well as any fluid migration through the linings 16, 18 themselves is effectively diminished. The channels 50, 70 may be cut by any machine tool known in the art, but it should be appreciated that this structure provides an advantage over U.S. Pat. No. 4,776,600 to Kohn in that it eliminates the double undercut necessary to achieve the dovetail configuration described for the seal receiving channels of that disclosure. However, the benefit derived from a channel having an acutely angled outer wall is maintained. This benefit is that the acutely angled outer wall reduces or eliminates the likelihood of seal "roll-out" should seal 22 or seal 24 be subjected to lateral (i.e., radially outward) pressures while positioned in its respective channel. The elimination of extra machining, and the stress concomitant thereto, reduces the likelihood of rejects and failures due to stress delamination of linings 16 and 18.

To further enhance this resistance to seal roll-out, seal element 22 includes a top face 60, a bottom face 62, an outer face 64 and an inner face 66 with outer face 64 being formed at an acute angle $\alpha$ with respect to bottom face 62 and inner face 66 being formed at an angle $\beta$ that is at least 90°. Similarly, seal element 24 has a top face 80 a bottom face 82, an outer face 84 and inner face 86 with outer face 84 being formed at an acute angle $\alpha$ with respect to bottom face 82 and with inner face 86 formed at an angle with respect to bottom face 82 that is at least 90°. Again, the corresponding angles on each seal may be the same or different. Seal 22 is provided with an inwardly opening groove 58 adapted to receive a spring 59 so that it is spring-loaded in a radially outward direction. Likewise, second seal element 24 is provided with an inwardly opening groove 78 which receives a spring 79 so that it is spring-loaded in a radially outwardly direction.

With reference to FIG. 7, it may be seen that each of seal elements 22 and 24 have a thickness, as measured between their respective top walls 60, 80 and their respective bottom walls 62, 82, which thickness is slightly greater than the depth of their respective channels 50 and 70. Furthermore, it may now be seen that, in the preferred structure acute angle $\alpha$ is a larger acute angle $\phi$ so that an annular gap 90 exists between the outer sidewall 54 of channel 50 and outer face 64 of seal element 22. Similarly, an annular gap 92 is formed between outer sidewall 74 of channel 70 and outer face 84 of seal element 24. Furthermore, by having angle $\theta$ larger than angle $\beta$, an annular gap 94 is formed between inner sidewall 56 of channel 50 and inner face 66 of seal element 22. Annular gap 96 is correspondingly formed between inner sidewall 76 of channel 70 and inner face 86 of seal element 24. Gaps 90, 92, 94 and 96 thus allow for the deformation of seal elements 22 and 24 when they are compressed between flanges 32 and 36 in the compressed state, shown in FIG. 8.

Figure 9:
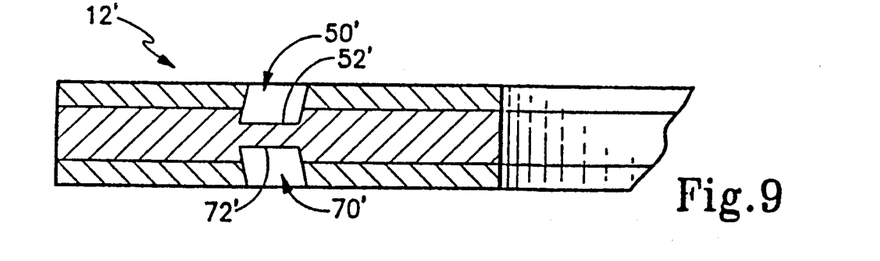
FIG. 9 is a cross-sectional view, similar to FIGS. 6-8 of a first alternative embodiment of the gasket body of the present invention but without the ring seals therein.

Finally, with reference to FIGS. 1-8, it may be seen that channel 50 has a larger radius than channel 70 and, correspondingly, ring seal element 22 has a larger radius than ring seal 24 so that channels 50 and 70 are radially offset from one another. However, with reference to FIG. 9, it may be seen that these channels may be placed directly opposite one another so that a common ring seal element will fit in either channel 50' or 70'. This eliminates the need for different sized machining configurations to construct channels 50' and 70' and eliminates the need for two different sized seal elements. However, the structure shown in FIG. 9 has a disadvantage in that metal plate 14 has a substantially reduced thickness in the region between juxtaposed bottom walls 52' and 72' of channels 50' and 70', respectively. This first alternative embodiment of gasket body 12' may readily be employed, however, in situations not requiring the strength advantage of the offset channels of the embodiment shown in FIGS. 1-8.

Figure 10:
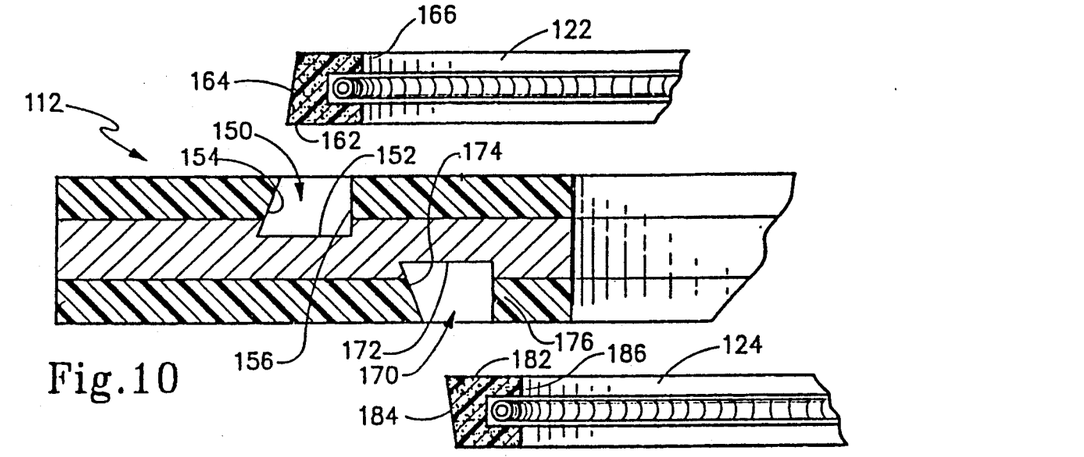
FIG. 10 is a cross-sectional view, similar to FIG. 6 showing a second alternative embodiment of the isolation gasket of the present invention shown in cross-section and with the ring seals removed therefrom.

A second alternative embodiment of the present invention is shown in FIG. 10 where it may be seen that gasket body 112 is again provided with offset channels. In this configuration, though, offset channels 150 and 170 are trapezoidal in cross-section instead of having a cross-section in the shape of a parallelogram as shown in FIGS. 6-8. Here, also, bottom wall 152 forms a right angle with inner wall 156 of channel 150 and, similarly, bottom wall 172 forms a right angle with inner sidewall 176 of channel 170. Bottom wall 152 and outer sidewall 154 as well as bottom wall 172 and outer sidewall 174 again form acute angles to prevent gasket roll-out for radially outward forces. Seal element 122 is structured with a trapezoidal cross-section and is larger in diameter than seal element 124 which is also structured of a similar trapezoidal cross-section. Thus, bottom face 162 forms an acute angle with outer face 164 and forms a right angle with inner face 166 of seal element 122. Likewise, bottom wall 182 of seal element 124 forms a large acute angle with outer face 184 and forms a right angle with inner face 186.

Figure 11:
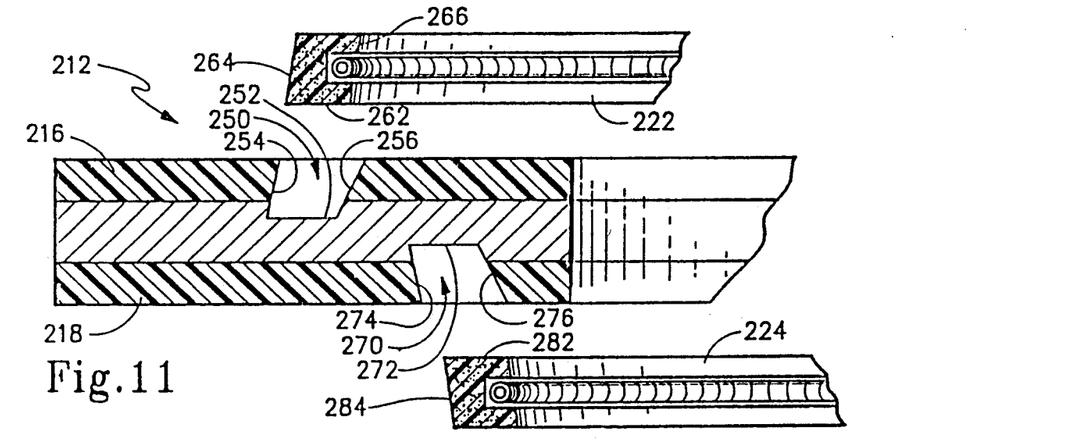
FIG. 11 is a cross-sectional view, similar to FIGS. 6 and 10, showing a third alternative embodiment of the isolation gasket according to the present invention with the ring seals shown removed from the gasket body.

It is possible to structure the seal receiving channels so that the opening of each channel is larger than its respective bottom wall. This embodiment is shown in FIG. 11 wherein gasket body 212 has first and second channels 250, 270 respectively having bottom walls 252, 272, outer sidewalls 254, 274 and inner sidewalls 256, 276. Here, the acute angle between bottom wall 252 and outer sidewall 254, when summed with the obtuse angle between bottom wall 252 and inner sidewall 256 total in excess of 180°. Thus, the opening through first outer lining 216 is wider than the width of bottom wall 252. Similarly, the sum of the acute angle between bottom wall 272 and outer sidewall 274 of channel 270 and the obtuse angle between inner sidewall 276 and bottom wall 274 exceed 180° so that the opening in channel 270 is wider than the width of bottom wall 272. This allows for easier insertion of seal elements 222 and 224 while maintaining the outer acute angle of faces 262, 264 and faces 282 and 284, thereof.

Figure 12:
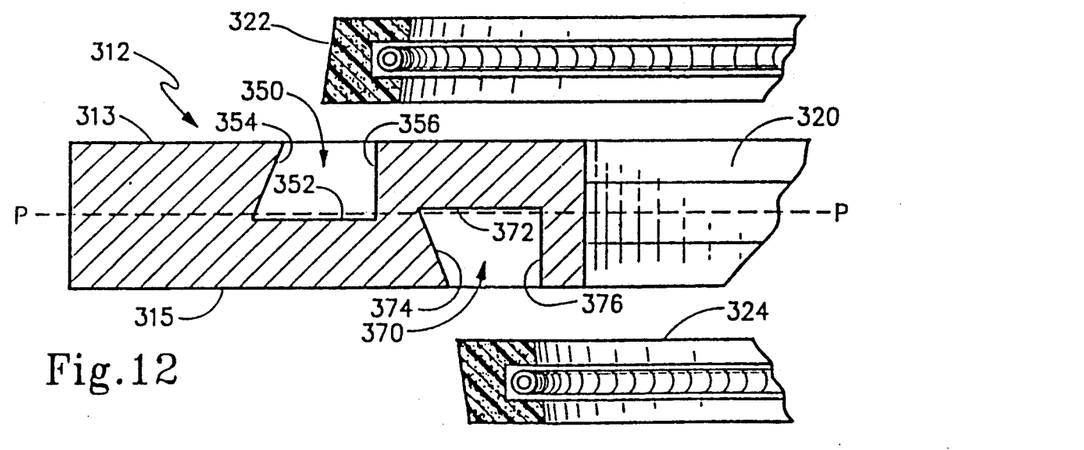
FIG. 12 is a cross-sectional view, similar to FIGS. 6, 10 and 11, showing a fourth alternative embodiment of an isolation gasket according to the present invention with the ring seals shown removed from the gasket body.

Yet another embodiment of the present invention is shown in FIG. 12 wherein a gasket body 312 is formed of an integral piece of composite material. Thus, the laminate construction described with respect to the embodiments of FIGS. 1-11 is eliminated in favor of the unitary composite structure. However, it should be understood that it would be possible to form the composite gasket body 312 as a laminate structure of a plurality of layers of composite material, and this would be similar to eliminating the inner metal plate, such as plate 14 shown in FIGS. 2, 5 and 6 and laminating linings 16 and 18 to one another.

In FIG. 12, gasket body 312 has a pair of offset endless channels 350 and 370 which extend around central opening 324 with these channels adapted, respectively, to receive seal elements 322 and 324. In order to prevent radial migration of pressurized fluid, such as oil or gas, through gasket body 312, channels 350 and 370 are formed of sufficient depth so that they overlap one another; that is, the sum of the depths of channels 350 and 370, is greater than the thickness of gasket body 312 measured between first and second sides 313 and 315. Conveniently, each of channels 350 is formed slightly more than fifty percent of the thickness of gasket body 312 so that each extends from a respective side 313, 315 through a plane "P+ which passes through the center of gasket body 312.

Channels 35, 370 are similar to channels 150, 170 (shown in FIG. 10) with the exception of the over-lapping depth noted above. To this end, channel 350 has a bottom wall 352, an outer sidewall 354 formed at an acute angle with respect to bottom wall 352 and an inner sidewall 356 formed at an angle of at least 90° with respect to bottom wall 352. In FIG. 12, bottom wall 352 and inner sidewall 356 are at right angles to one another and receive the parallelogram cross-section of seal element 322. Likewise, channel 370 has a bottom wall 372, an outer sidewall 374 formed at an acute angle with respect to bottom wall 372, and an inner sidewall 376 formed at an angle with respect to bottom wall 372 of at least 90°. Again, bottom wall 372 and inner sidewall 376 are at right angles to one another so that channel 370 may receive the parallelogram cross-section of seal element 324. Naturally, it should be understood that channels 350 and 370 of FIG. 12 could take on any configuration, or modification to configuration, described with any of the foregoing embodiments as within the scope of this invention.

From the foregoing description it may be appreciated that isolation gaskets having different geometric shapes and sizes as well as different channel configurations, both as to cross-section and path (i.e., non-circular) are encompassed within the concept of this invention. Accordingly, although the present invention has been described with some degree of particularity directed to the embodiment of the present invention in the form of flange gaskets, it should be appreciated that the invention is to be defined by the following claims construed in light of the prior art so that modifications or changes may be made to the preferred embodiment of the present invention without departing from the inventive concepts contained herein.

I claim:
1. A gasket adapted to be interposed between joined pieces in a flow line that is operative to convey a flow of fluid, comprising:
   (a) a flat gasket body formed of an inner plate of metal and a pair of outer linings of electrically insulative material bonded to said inner plate, said gasket body having a central opening formed therethrough and wherein each of said outer linings has an endless channel surrounding the central opening and formed at a selected depth through said outer lining and into said inner plate such that each said endless channel has a bottom wall, an outer sidewall formed at an acute angle $\phi$ with respect to said bottom wall and an inner sidewall formed at an angle $\phi$ of at least ninety degrees with respect to said bottom wall; and
   (b) a seal element disposed in each said channel.
2. A gasket according to claim 1 wherein said endless channels are opposite one another.
3. A gasket according to claim 1 wherein said endless channels are radially offset with respect to one another.
4. A gasket according to claim 1 wherein the inner sidewall of each said endless channel is formed perpendicularly to the bottom wall thereof.
5. A gasket according to claim 1 wherein each said endless channel has a cross-section that is a parallelogram.
6. A gasket according to claim 1 wherein each said endless channel has a trapezoidal cross-section.
7. A gasket according to claim 1 wherein each said seal element is removably disposed in a respective said endless channel, each said seal element having a bottom face adapted to abut the bottom wall of the respective said endless channel when inserted therein, an outer face formed at an acute angle $\alpha$ with respect to said bottom face and an inner face formed at an angle with respect to said bottom face.
8. A gasket according to claim 7 wherein the acute angle $\alpha$ of each said seal element is larger than the acute angle $\phi$ of its respective said endless channel.
9. A gasket according to claim 8 wherein the angle $\beta$ of each said seal element is smaller than the angle $\theta$ of its respective said endless channel.
10. A gasket according to claim 7 wherein each said seal element has a top face opposite the bottom face thereof so that said seal element has a thickness between its top and bottom faces, the thickness of each said seal element being greater than the selected depth of the respective said endless channel.
11. A pipe flange gasket adapted to be interposed between a pair of facing flanges of two joined pieces in a pipe system that is operative to convey a flow of high pressure fluid, comprising:
   (a) a flat annular gasket body having a circular opening and having a central axis perpendicular to said gasket body with the central axis passing through the circular opening, said gasket body formed of an inner plate of metal, a first outer lining of electrically insulative material bonded to said inner plate on a first side thereof, and a second outer lining of electrically insulative material bonded to said inner plate on a second side thereof so that said inner plate is laminated between said first and second outer linings, said gasket body having a circular first channel surrounding the central opening and formed at a selected depth through said first lining and into said inner plate so that the first channel has a first channel bottom wall, a first channel outer sidewall formed at a first acute angle $\phi$ with respect to said first channel bottom wall and a first channel inner sidewall formed at a first angle $\Theta$ at least ninety degrees with respect to said first channel bottom wall, said gasket body having a circular second channel surrounding the central opening and formed at a selected depth through said second lining and into said inner plate so that the second channel has a second channel bottom wall, a second channel outer sidewall formed at a second acute angle $\phi$ with respect to said second channel bottom wall and a second channel inner sidewall formed at a second angle $\phi$ at least ninety degrees with respect to said second channel bottom wall;

(b) a circular first seal element disposed in the first channel; and (c) a circular second seal element disposed in the second channel.

12. A pipe flange gasket according to claim 11 wherein said first and second channels are formed with a common radius of curvature so that said first and second channels are opposite one another.

13. A pipe flange gasket according to claim 11 wherein said first and second channels are formed with different radii of curvature so that said first and second channels are offset from one another.

14. A pipe flange gasket according to claim 11 wherein the first channel inner sidewall is formed perpendicularly to the first channel bottom wall and wherein the second channel inner sidewall is formed perpendicularly to the second channel bottom wall.

15. A pipe flange gasket according to claim 11 wherein each of said first and second channels has a cross-section that is a parallelogram.

16. A pipe flange gasket according to claim 1 wherein each of said first and second channels has a trapezoidal cross-section.

17. A pipe flange gasket according to claim 11 wherein each of said first and second seal elements is removably disposed in a respective one of said first and second channels, said first seal element having a first seal bottom face adapted to abut the first channel bottom wall channel when inserted in said first channel, a first seal outer face formed at a first acute angle $\alpha$ with respect to said first seal bottom face and a first seal inner face formed at a first angle $\beta$ with respect to said first seal bottom face, said second seal element having a second seal bottom face adapted to abut the second channel bottom wall when inserted in said second channel, a second seal outer face formed at a second acute angle $\alpha$ with respect to said second seal bottom face and a second seal inner face formed at a second angle $\beta$ with respect to said second seal bottom face.

18. A pipe flange gasket according to claim 17 wherein first angle $\alpha$ is larger than first angle $\phi$, second angle $\alpha$ is larger than second angle $\phi$, first angle $\beta$ is smaller than first angle $\Theta$ and second angle $\beta$ is smaller than second angle $\Theta$.

19. A pipe flange gasket according to claim 17 wherein said first seal element has a first seal top face opposite the first seal bottom face so that said first seal element has a thickness therebetween and wherein said second seal element has a second seal top face opposite the second seal bottom face so that said second seal element has a thickness therebetween, the thickness of each said first and second seal element being greater than the selected depth of the respective one of said first and second channels.

20. A gasket adapted to be interposed between joined pieces in a flow line that is operative to convey a flow of fluid, comprising:

(a) a flat gasket body having opposite first and second sides and formed of composite material to have a selected thickness and having a central opening formed therethrough, said gasket body having a first endless channel formed at a selected depth in said first side so that said first channel has a first channel bottom wall, a first channel outer sidewall is formed at a first acute angle $\phi$ with respect to said first channel bottom wall and a first channel inner sidewall formed at a first angle $\Theta$ of at least ninety degrees with respect to said first channel bottom wall, said gasket body having a second endless channel offset from said first channel and formed at a second selected depth so that the second channel has a second channel bottom wall, a second channel outer sidewall formed at a second acute angle $\phi$ with respect to said second channel bottom wall and a second channel inner sidewall formed at a second angle $\Theta$ of at least ninety degrees with respect to said second channel bottom wall;

(b) a first seal element disposed in the first channel said first seal element having a first seal bottom face adapted to abut the first channel bottom wall channel when inserted in said first channel, a first seal outer face formed at a first acute angle $\alpha$ with respect to said first seal bottom face and a first seal inner face formed at a first angle $\beta$ with respect to said first seal bottom face; and (c) a second seal element disposed in the second channel said second seal element having a second seal bottom face adapted to abut the second channel bottom wall when inserted in said second channel, a second seal outer face formed at a second acute angle $\alpha$ with respect to said second seal bottom face and a second seal inner face formed at a second angle $\beta$ with respect to said second seal bottom face wherein first angle $\alpha$ is larger than first angle $\phi$, first angle $\beta$ is smaller than first angle $\Theta$ and second angle $\beta$ is smaller than second angle $\Theta$.

21. A gasket according to claim 20 wherein said gasket body is formed of an integral piece of composite material.

22. A gasket according to claim 20 wherein said gasket body is formed of a plurality of layers of composite material laminated to one another.

23. A gasket according to claim 20 wherein said first seal element has a first seal top face opposite the first seal bottom face so that said first seal element has a thickness therebetween and wherein said second seal element has a second seal top face opposite the second seal bottom face so that said second seal element has a thickness therebetween, the thickness of each said first and second seal element being greater than the selected depth of the respective one of said first and second channels.

* * * * *